April 29, 1969 R. L. BAIR ET AL 3,441,237
WOVEN TAPE FOR AIRCRAFT LAUNCHING AND ARRESTING APPARATUS
Filed Jan. 16, 1967
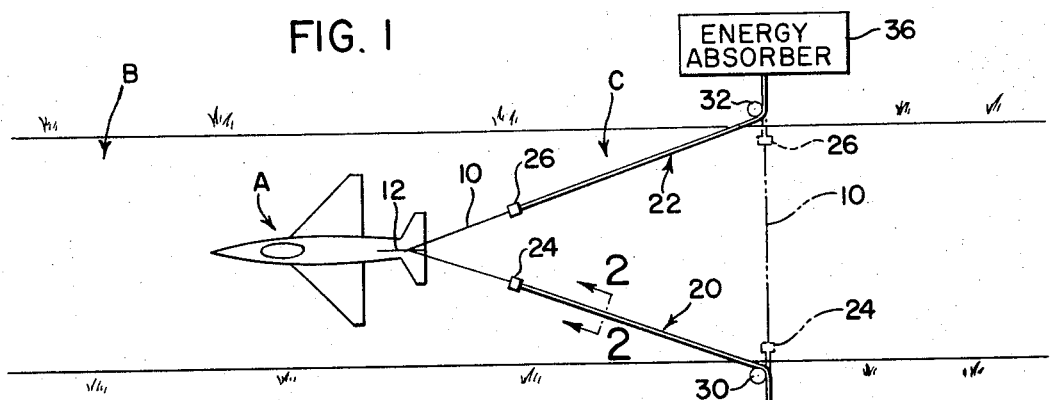
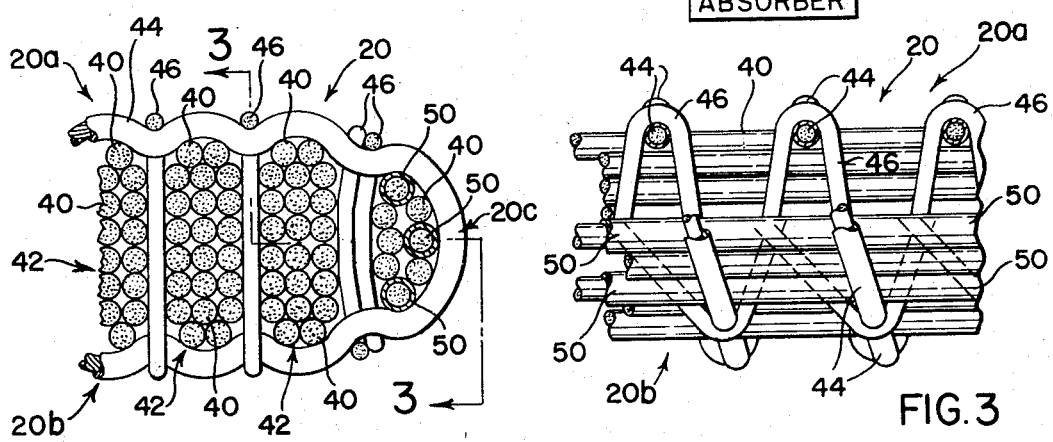
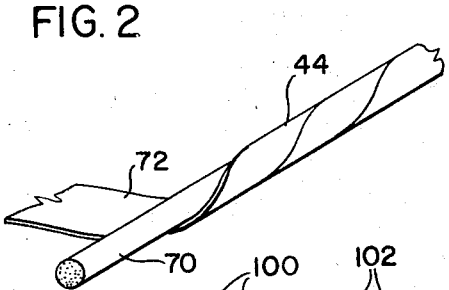
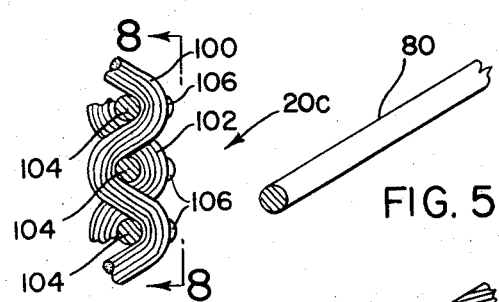
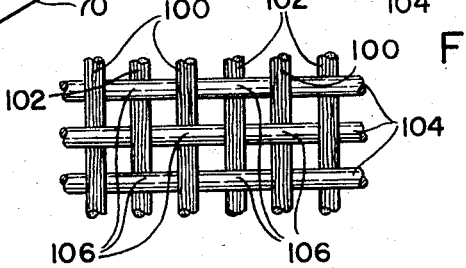
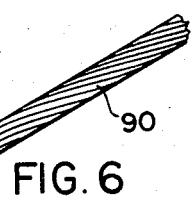
INVENTORS.
ROBERT L. BAIR &
CHARLES S. THOMPSON
BY
*Meyer, Tilberry & Body*
ATTORNEYS

United States Patent Office 3,441,237
Patented Apr. 29, 1969

3,441,237
WOVEN TAPE FOR AIRCRAFT LAUNCHING AND ARRESTING APPARATUS
Robert L. Bair, Ashland, and Charles S. Thompson, Vincentown, N.J., assignors to E. W. Bliss Company, Canton, Ohio, a corporation of Delaware
Filed Jan. 16, 1967, Ser. No. 609,379
Int. Cl. B64f 1/02; D03d 15/00; B64c 25/68
U.S. Cl. 244—110                                   11 Claims

ABSTRACT OF THE DISCLOSURE

An elongated woven tape of the type used in aircraft launching and arresting apparatus and including a plurality of longitudinal and transverse synthetic strands interwoven to form a flat tape with opposed flat surfaces and opposed edge portions. The tape is provided with improved resistance to edge abrasion by having first strands or elements of high abrasion resistance extending longitudinally of the edges and second similar elements wrapped about the longitudinally extending strands and interwoven with at least some of the transverse strands at the edge portions to provide longitudinally spaced outboard wear resistant humps.

---

This invention pertains to the art of aircraft launching and arresting and more particularly to an improved woven tape for use in aircraft launching and arresting apparatus.

The invention is particularly applicable to a woven tape for use in aircraft launching and/or arresting apparatus, and it will be described with particular reference thereto; however, the invention has much broader applications and may be used in a variety of environments requiring a high tensile strength woven tape with superior wearing characteristics.

In recent years much work has been done in developing apparatus for launching and arresting aircraft, both military and commercial. The most widely used apparatus for performing these functions have included a flat woven tape coilable onto and uncoilable off of a rotatably mounted reel, means for connecting the tape onto an aircraft, and an energy absorber or drive unit to retard rotation of the reel or rotate the reel. The energy absorber is used when an aircraft is to be arrested by the apparatus, while the drive unit is used when an aircraft is to be launched by the apparatus. This highly successful type of launching and arresting apparatus was made possible by the use of a woven tape as fully disclosed and claimed in United States Letters Patent No. Re. 25,406. Because of the elasticity and the load carrying strength of this woven tape, it is now possible to handle, in both launching and arresting apparatus, heavy aircraft travelling at relatively high speeds with uniformity and reliability. The present invention relates to an improvement in this type of high tensile strength woven tape. For simplicity, the remainder of this application will be devoted to a discussion of a woven tape used in an apparatus for arresting aircraft; however, it is appreciated that the improved woven tape disclosed herein has equal applicability to aircraft launching apparatus and other mechanisms requiring a high strength, woven tape of improved wearing characteristics.

When an aircraft is arrested by an apparatus of the type mentioned above, the aircraft engages a pendant stretched across a runway and attached to the woven tape which is coiled ont othe afore-mentioned reel. After this engagement, the pendant and the tape are carried down the runway by the aircraft. In this manner, the woven tape is uncoiled from the reel against the retarding action of an appropriate energy absorber. Consequently, the tape comes into an abrading contact with various wearing surfaces, such as the runway which is usually formed from concrete or a similar highly abrasive material.

The flat woven tape used in aircraft arresting is formed from a plurality of interwoven longitudinal and transverse strands each formed from a synthetic material, such as nylon or its equivalent, to name only one. As this woven tape is pulled along the abrading surface of the runway, it is rapidly worn by the abrasive surface of the runway. Since the flat top and bottom surfaces of the woven tape have relatively large areas, the tape being 7-16 inches in width, the rate at which the large surfaces ar worn by abrasions is relatively low. Accordingly, wear of the flat surfaces is not considered a distinct disadvantage. On the other hand, the flat woven tape of an arresting apparatus, known in the art as an arresting gear, may have a thickness of less than ½ inch. Consequently, the edges of the tape have a relatively small exposed surface area which must absorb all of the wear along the edges of the tape. For this reason, the synthetic strands woven into the edge portions of the arresting gear tape may be completely worn through after only a few arrestments. When the strands in the edge portions of the tape are worn through, the woven tape tends to unravel. This requires a replacement of the tape which is both time consuming and expensive. Also, the arresting gear is inoperative while the tape is being replaced. The problem of edge wear is more pronounced when the woven tape includes an outer woven casing or envelope which may unravel when a strand, or a group of strands, adjacent the edge of the tape is broken by the wear experienced during operation of the arresting gear.

This disadvantage of woven synthetic tape for use in arresting and launching aircraft is overcome by the present invention which is directed toward an improved woven tape which appreciably increases the wear resistance of the tape edges without a concomitant decrease in the elasticity, flexibility or other necessary requirements of the tape as fully explained in the afore-mentioned United States Letters Patent.

In accordance with the present invention there is provided an improved elongated flat woven tape of the type used in aircraft launching and arresting apparatus or gear. This improvement comprises, essentially, the incorporation along the opposed edge portions of the woven tape of elongated elements having an outer surface with higher wear resistant characteristics than those of the synthetic strands comprising the major part of the woven tape. These elements, in accordance with the preferred embodiment of the invention, have an outer metal surface which may be provided by, either covering a synthetic material with a layer of metal, or by forming the elements from metal, as a single strand or as multistrands. In addition, these high wear resistant elements may extend transversely across the woven tape and around the opposed edges, longitudinally along the opposed edges with an appropriate interweaving so that the edges exhibit a high wear resistance surface, or a combination of both longitudinally and transversely extending, interwoven elements having the afore-mentioned high wear resistant characteristics.

The primary object of the present invention is the provision of a flat woven tape of the type used in aircraft launching and arresting apparatus, which tape has improved wear resistance.

Another object of the present invention is the provision of a flat woven tape of the type used in aircraft launching and arresting apparatus, which tape includes high wear resistant elements in the edge portions thereof.

Yet another object of the present invention is the provision of a woven tape as defined above which includes high wear resistant elements woven into the edge portions thereof.

Yet another object of the present invention is the provision of a flat woven tape of the type used in aircraft launching and arresting apparatus, which tape includes metal or metal covered strands or elements in the edge portions thereof to increase the edge wear resistance of the woven tape.

These and other objects and advantages will become apparent from the following description used to illustrate the preferred embodiment of the invention as read in connection with the accompanying drawings in which:

FIGURE 1 is a top plan view illustrating, schematically, the environment for which the present invention is particularly adapted;

FIGURE 2 is an enlarged cross-sectional view taken generally along line 2—2 of FIGURE 1 and showing one embodiment of the present invention;

FIGURE 3 is a cross-sectional view taken generally along line 3—3 of FIGURE 2;

FIGURE 4 is an enlarged pictorial view showing one embodiment of an element contemplated for use in the present invention;

FIGURES 5 and 6 are enlarged pictorial views showing modifications of the element illustrated in FIGURE 4;

FIGURE 7 is an enlarged partial, cross-sectional view illustrating the preferred embodiment of the present invention; and FIGURE 8 is an edge elevational view taken generally along line 8—8 of FIGURE 7.

Referring now to the drawing wherein the showings are for the purpose of illustrating preferred embodiments of the invention only and not for the purpose of limiting same, FIGURE 1 illustrates an aircraft A being arrested as it travels along runway B. The arrestment is accomplished by somewhat schematically illustrated arresting apparatus or gear C. The arresting gear includes a pendant 10, shown in phantom lines before arrestment and in solid line after arrestment has commenced. In accordance with known practice, pendant 10 is engaged by a hook 12, or another appropriate modification on the bottom of the aircraft, so that the aircraft will drag the pendant down the runway. Flat woven tapes 20, 22 are connected onto opposite ends of pendant 10 by appropriate couplings, represented as blocks 24, 26. By provision of sheaves 30, 32, the woven flat tapes are reeved across the runway and they are payed out, during arrestment, from appropriate energy absorbers 34, 36. Of course, various energy absorber devices could be used in the arresting gear C without departing from the intended spirit and scope of the present invention which will become evident from the following description.

Referring now more particularly to FIGURES 2 and 3, the flat woven tapes 20, 22 are substantially identical; therefore, only tape 20 will be discussed, and this discussion will apply equally to tape 22. Tape 20 includes an upper large area surface 20a, a lower large area surface 20b and opposed edge portions 20c, only one of which is illustrated in FIGURE 2. As the tape 20 is pulled down the runway B, there is a high abrasion action between the tape and the runway; therefore, as explained before, serious wear along the edge portions 20c occurs during normal operation of the arresting gear C. The present invention is directed toward an improvement in the woven tapes 20, 22 which increases the wear resistance of the edge portions 20c without seriously affecting the physical characteristics of the tape which are essential to the successful operation of the tape in arresting or launching gear.

The tape 20, as partially shown in FIGURES 2 and 3, includes a plurality of longitudinally extending stuffer warps or strands which are each formed from a substantial number of small synthetic filaments. These filaments may be nylon, nylon equivalents, or other high tensile strength synthetic materials which are well within the knowledge of persons familiar with the construction of woven tape for arresting gear and launching gear. As is apparent in FIGURE 2, the stuffer warps or strands 40 are grouped in parallel rows of strength bundles 42 provided across the width of the tape. These serve as primary load bearing elements for transmitting braking forces from the energy absorber to the aircraft A. A casing or envelope surrounds the parallel bundles 42 in a manner to hold the bundles into a flat tape configuration having the afore-mentioned upper surface, lower surface, and opposed edge portions. The envelope is schematically represented as transverse support strands or elements 44 and interwoven, longitudinally extending support strands 46. The weaving of tape 20 as shown in FIGURES 2 and 3 is only representative and in practice the weave forms a more homogeneous structure. As so far described, the woven tape 20 does not differ substantially from previously known tapes which were subjected to rapid wear at the edge portions 20c. When this wear severed the transverse support strands or elements 44, the envelope could unravel and the load carrying stuffer warps or strands could become displaced. This presented an immediate maintenance task.

In accordance with the embodiment of the invention illustrated in FIGURE 2, the transverse support strands or elements 44 are provided with an outer surface having a higher abrasion resistance than the outer surface of the load carrying strands 40. Although a variety of structures could be used to provide the transverse support strands with the necessary abrasion resistant outer surfaces, the preferred embodiment of the present invention is illustrated in FIGURE 4. In this instance, the element 44 has an inner core of multi-filament, synthetic material, such as nylon, and an outer surface formed from a metal foil 72. This metal foil preferably is aluminum and is sold under the tradename "Alumet" or "Heavy Gold Alumet"; however, other metal foils or strips could be used. In addition, it has been found that two layers of metal foil can also be wrapped around the core 70 to provide a thicker wearing surface for the transverse support strands or elements 44.

By providing the elements 44 with a metal outer surface or covering, these support elements extend outwardly from the edges of the tape to define the outermost edge surfaces of the tape. Consequently, before the edge portions of the tape can be damaged by wear, wear must take place through the metal outer coatings or surfaces of the strands 44. This greatly enhances the wear resistance of the edge portions 20c of the woven tape without seriously affecting the load carrying ability and other physical properties of the tape which are essential for use of the tape in arrestment of aircraft.

In accordance with the embodiment of the invention shown in FIGURE 3, metal covered multi-filament nylon strands 50 are laid longitudinally along the edge portions 20c of the tape. This improves, still further, the wearing characteristics at the edge portions of the woven tape.

Referring now to FIGURE 5, the elements 44 and/or 50 may be formed from a solid metal wire 80, which wire may be formed from stainless steel, aluminum or other high wear resistant flexible materials. In addition, as shown in FIGURE 6, the elements 44, 50 may be formed from an intertwisted or cabled group of metal wires. This improves the flexibility of the wires without seriously affecting the wear resistant characteristics thereof. In addition, other similar arrangements could be visualized for providing elements 44, 50 with an outer surface which has a wear resistance substantially higher than the wear resistance of the load carrying strands 40. By constructing a tape with these high wear resistant elements within the edge of the tape, the number of arrestments before detrimental edge wear of the tape is substantially increased; therefore, the life of the tape is increased.

In accordance with the preferred embodiment of the invention, the wear resistant elements in the edge portions 20c of tape 20 are interwoven in a manner illustrated in FIGURES 7 and 8. The transversely extending strands 100, 102 are formed from a material similar to that used for the load carrying strands 40. In other words, these transversely extending strands may be multi-filament nylon, its equivalents, or other high tensile strength synthetic materials. At the edge of a tape constructed in accordance with FIGURES 7 and 8, there are provided a plurality of longitudinally extending metal elements 104 which are woven into the edge portions of the tape to provide outwardly extending, or outboard humps 106. Since the elements 104 are formed to provide an outer surface having a high wear resistant characteristic, the humps 106 provide wearing points for the edge portions of the tape. These wearing points, or humps, extend along the length of the tape edge and provide protection for the synthetic strands 100, 102 which are also interwoven within the edge portions 20c of the tape. Before the casing around the load carrying strand 40 can become severed and unraveled, the humps 106 must be worn appreciably. This requires a substantial length of time due to the high wear resistance of the elements forming these humps.

Although solid metal elements 104 have been illustrated in FIGURES 7 and 8, various other elements having high wear resistant, outer surfaces may be incorporated in the edge of the tape without departing from the intended spirit and scope of the present invention. The interwoven construction as illustrated in FIGURES 7 and 8 is preferred since it would require a lesser modification of the normal weaving procedure; however, the embodiment of the invention illustrated in FIGURES 2 and 3 is also possible. In addition, the transverse strands 100, 102 may also be formed from linear elements having high wear resistant outer surfaces.

Having thus described our invention, we claim:

1. In an elongated flat woven tape of the type used in aircraft launching and arresting apparatus, said tape including a plurality of longitudinal and transverse synthetic strands having a given abrasion resistance and interwoven to form said flat tape with opposed flat surfaces and opposed edge portions, the improvement comprising: elongated elements having an external surface with an abrasion resistance, at least one of said elements being coextensive with each of said tape edges, at least one other of said elements extending circumferentially and longitudinally about said longitudinally extending strands and being interweaved with at least some of said transverse strands at said edge portions to provide longitudinally spaced outboard wear resistant humps.

2. The improvement as defined in claim 1 wherein said elements have outer metal surfaces.

3. The improvement as defined in claim 1 wherein said elements are formed from synthetic strands with an outer layer of metal.

4. The improvement as defined in claim 1 wherein said elements are formed from synthetic strands with a metal foil wrapped therearound to form said outer surface.

5. The improvement as defined in claim 1 wherein said elements are formed from a flexible metal.

6. The improvement as defined in claim 5 wherein said metal is steel.

7. The improvement as defined in claim 5 wherein said metal is stainless steel.

8. The improvement as defined in claim 5 wherein said metal is aluminum.

9. The improvement as defined in claim 1 wherein each of said elements is formed from intertwisted filaments of metal.

10. The improvement as defined in claim 9 wherein said metal is steel.

11. The improvement as defined in claim 1 wherein each of said edge portions includes transversely extending strands of said woven tape and at least some of said transversely extending strands in said edge portions having an external surface with an abrasion resistance substantially greater than said given abrasion resistance.

References Cited

UNITED STATES PATENTS

| | | | |
|---|---|---|---|
| 2,458,243 | 1/1949 | Biddle | 57—140 |
| 2,731,046 | 1/1956 | Bachner | 57—151 |
| 3,350,037 | 10/1967 | Thompson et al. | 244—110 |

FOREIGN PATENTS

| | | |
|---|---|---|
| 859,670 | 1/1961 | Great Britain. |

MILTON BUCHLER, *Primary Examiner.*

P. E. SAUBERER, *Assistant Examiner.*

U.S. Cl. X.R.

139—420